No. 656,797. Patented Aug. 28, 1900.
C. WIGG.
VEHICLE BRAKE.
(Application filed Dec. 18, 1899.)
(No Model.)
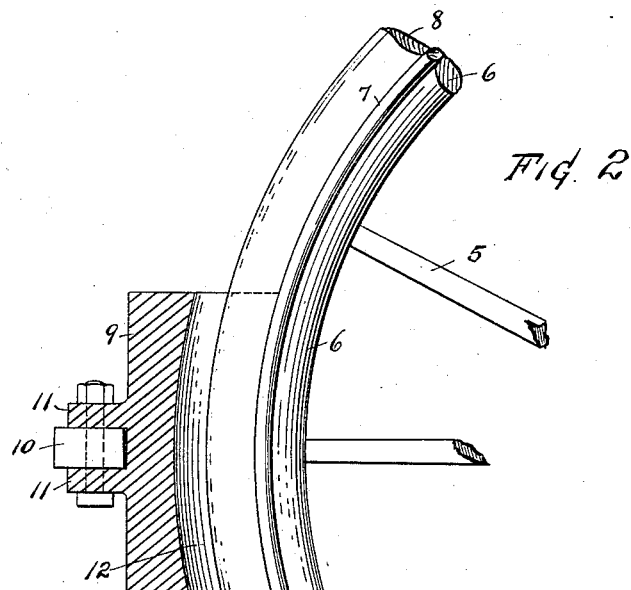
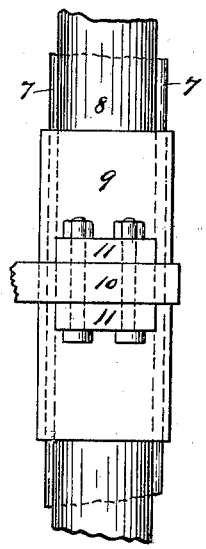
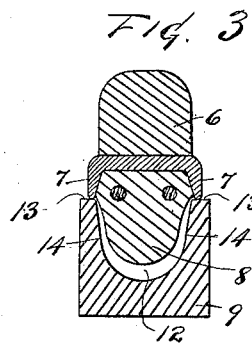
WITNESSES:
INVENTOR
Curtis Wigg.
BY
George P. Van Wye.
ATTORNEY

UNITED STATES PATENT OFFICE.

CURTIS WIGG, OF NEW YORK, N. Y.

VEHICLE-BRAKE.

SPECIFICATION forming part of Letters Patent No. 656,797, dated August 28, 1900.

Application filed December 18, 1899. Serial No. 740,748. (No model.)

*To all whom it may concern:*

Be it known that I, CURTIS WIGG, a citizen of the United States, residing at New York, in the county and State of New York, have invented a new and useful Vehicle-Brake, of which the following is a specification.

My invention relates to improvements in brakes for vehicles; and the object thereof is to provide a brake for that class of vehicles having rubber tires mounted in metal rims with projecting flanges, forming a channel in which the tire is mounted which shall engage the peripheries of the said flanges and not come in contact with the rubber tires.

The invention is illustrated in the accompanying drawings, in which—

Figure 1 is a view in elevation of my improved brake-shoe secured to the brake-rod and of a portion of a vehicle-wheel. Fig. 2 is a central vertical section thereof, and Fig. 3 is a transverse section thereof and of the tire and rim of the wheel.

Similar numerals of reference refer to like parts.

I have shown at 5 a portion of a vehicle-wheel with a metal rim 6, having flanges 7 of the usual construction, whereby a channel is formed in which is mounted the rubber tire 8, making what is commonly known as a "solid-rubber-tired wheel."

My improvement consists of a brake-shoe 9, which may be secured to a brake-rod 10 by means of the flanges 11 or may be connected with a brake in any desired manner, and the brake-shoe 9 is provided with a longitudinal groove 12, which is considerably deeper than the perpendicular height of the rubber tire 8 above the flanges 7, and the inner wall of said groove, as well as the face of said shoe, curves concentrically with said tire and flanges.

The groove 12 divides the face of the shoe into two ribs 13, and the width of the groove at the face is such that it will permit the rubber tire to move freely within the same without contact or with only slight contact, so the ribs 13 will contact with the peripheries of the flanges 7, and, as before stated, the face of the shoe being curved and concentric with the peripheries of the said flanges the contact between the flanges and ribs will be throughout the longitudinal extent of the said ribs. I also prefer to make the side walls 14 of the groove 12 slightly inclined inwardly, for the reason that the flanges 7 are usually made flaring, and as there will be wear in both flanges and shoe, the groove having a narrower opening as the shoe wears away, the ribs 13 will engage the entire surface of the peripheries of the worn flanges 7, as will be readily understood. As the groove 12 has considerable depth in order to protect the tread of the tire, the inclined sides 14 may contact with the sides of the tire without injury to the same, so that as the flanges of the rim wear away, as well as the brake-shoe, no injury will result from the contact of the inclined sides 14 with the sides of the tire.

The shoe is designed to be used with any ordinary vehicle-brake and is very desirable, for the reason that the rubber forming the tire is very expensive and is seriously worn and injured in a very short time if the brake-shoe is applied thereto.

My improved brake-shoe is preferably made of cast-iron, and as the rims are usually made of steel the flanges 7 will not wear away very rapidly and the tire will be entirely protected.

It is evident that changes can be made in the formation of the groove and the face of the ribs 13 might be cut away, as they will be in use, so that they will bear against both the peripheries and the sides of the flanges 7; but in a single brake-shoe adapted to bear against both flanges the pressure on the sides of the flanges would not be material. I reserve the right, however, to make all changes which fairly come within the scope of my invention.

Having thus described my invention, what I claim as new, and desire to secure by Letters Patent, is—

In a brake for rubber-tired vehicle-wheels, the herein-described brake-shoe, the same being provided with means by which it may be secured to the brake-rod, and having a curved face concentric with the peripheries of the flanges of the rim, in which is formed the groove 12, having inwardly-inclined side walls 14, substantially as, and for the purpose set forth.

In testimony whereof I have signed my name to this specification in the presence of two subscribing witnesses.

CURTIS WIGG.

Witnesses:
C. W. STAPLETON,
G. M. HOWELL.